United States Patent
Mösle et al.

(10) Patent No.: US 8,842,128 B2
(45) Date of Patent: Sep. 23, 2014

(54) IMAGE PROCESSING METHOD AND AN IMAGE PROCESSING DEVICE FOR CHANGING A SATURATION OF IMAGE DATA

(75) Inventors: Frank Mösle, Stuttgart (DE); Dong Zhou, Stuttgart (DE); Zhichun Lei, Mülheim an der Ruhr (DE)

(73) Assignee: SONY Corporation, Tokyo (JP)

( * ) Notice: Subject to any disclaimer, the term of this patent is extended or adjusted under 35 U.S.C. 154(b) by 210 days.

(21) Appl. No.: 13/469,639

(22) Filed: May 11, 2012

(65) Prior Publication Data

US 2012/0293530 A1 Nov. 22, 2012

(30) Foreign Application Priority Data

May 20, 2011 (EP) .................................... 11004211

(51) Int. Cl.
*G09G 5/02* (2006.01)
*G06K 9/00* (2006.01)
*G06T 11/00* (2006.01)

(52) U.S. Cl.
CPC .................................. *G06T 11/001* (2013.01)
USPC ........................................ 345/589; 382/167

(58) Field of Classification Search
None
See application file for complete search history.

(56) References Cited

U.S. PATENT DOCUMENTS

| | | | |
|---|---|---|---|
| 6,591,008 B1 | 7/2003 | Surve et al. | |
| 7,394,468 B2 | 7/2008 | Hofman et al. | |
| 7,605,930 B2 | 10/2009 | Suzuki et al. | |
| 2003/0142879 A1 | 7/2003 | Kim | |
| 2005/0105796 A1* | 5/2005 | Hong et al. | 382/162 |
| 2007/0182755 A1* | 8/2007 | Jones et al. | 345/592 |
| 2009/0066720 A1* | 3/2009 | Hong et al. | 345/603 |
| 2010/0134810 A1 | 6/2010 | Shimamura et al. | |
| 2010/0265342 A1 | 10/2010 | Liang et al. | |
| 2011/0229023 A1* | 9/2011 | Jones et al. | 382/162 |

FOREIGN PATENT DOCUMENTS

EP 1 326 425 A2 7/2003

OTHER PUBLICATIONS

Jia-Bin Huang, et al., "Enhancing Color Representation for the Color Vision Impaired", Workshop on Computer Vision Applications for the Visually Impaired, Sep. 2008, 12 pages.
Chin-Lun Lai, et al., "An Image Processing Based Visual Compensation System for Vision Defects", Fifth International Conference on Intelligent Information Hiding and Multimedia Signal Processing, 2009, pp. 559-562.
Communication under Rule 71(3) EPC issued Dec. 17, 2013, in European Patent Application No. 12 001 833.8-1906.
Extended European Search Report issued Jul. 16, 2012 in Application No. 12001833.8.

(Continued)

*Primary Examiner* — Joni Richer
*Assistant Examiner* — Yi Wang
(74) *Attorney, Agent, or Firm* — Oblon, Spivak, McClelland, Maier & Neustadt, L.L.P.

(57) ABSTRACT

A method of processing image data that includes identifying picture elements of a first image portion having a first hue and a first saturation assigned to the first hue, the first hue lying in a first critical hue interval, identifying picture elements a second image portion having a second hue and a second saturation assigned to the second hue, the second hue lying in a second critical hue interval, and changing the first saturation by an amount delta S, at least one of the first and the second hues not being changed, and the delta S varying for picture elements lying in the first image portion.

17 Claims, 4 Drawing Sheets

(56) References Cited

OTHER PUBLICATIONS

Jacek Ruminski, et al., "Color Transformation Methods for Dichromats", Human System Interactions (HSI), May 13, 2010, XP031711320, pp. 634-641.

Seungji Yang, et al., "Visual Contents Adaptation for Color Vision Deficiency", Proceedings 2003 International Conference on Image Processing (Cat. No. 03CH37429), vol. 1, Sep. 14, 2003, pp. 453-456.

Ugo Erra, et al., "Personalizable edge service for Web accessibility", Univ. Access Inf. Soc., vol. 6, No. 3, Sep. 29, 2007, pp. 285-306.

* cited by examiner

IMAGE PROCESSING METHOD AND AN IMAGE PROCESSING DEVICE FOR CHANGING A SATURATION OF IMAGE DATA

CROSS REFERENCE TO RELATED APPLICATION

The present application claims the benefit of the earlier filing date of 11 004 211.6 filed in the European Patent Office on May 20, 2011, the entire content of which application is incorporated herein by reference.

FIELD OF THE INVENTION

The present specification generally relates to an image processing method and an image processing device. The specification further refers to a computer program and a display device comprising the image processing device.

BACKGROUND OF THE INVENTION

Color vision deficiency or color-blindness relates to a decreased ability to discriminate between colors. Generally, there are two major types of color blindness. For example, there are those who have difficulty distinguishing between red and green and those who have difficulty distinguishing between blue and yellow.

There are several causes for these types of color blindness to take place and there are several gradations of the deficiency. For example, persons may have difficulty distinguishing between two colors. Dichromacy is a color vision defect in which one of the three basic color mechanisms is absent or not functioning. For example, protanopia is a type of color vision deficiency caused by the complete absence of red retinal photoreceptors. Accordingly, for a person having protanopia red appears dark. Further, deuteranopia is a color vision deficiency, in which the green retinal photoreceptors are absent so that it cannot be discriminated between red and green. Tritanopia is a color vision deficiency, in which the blue retinal receptors lack. Further, there exists a further type of color vision deficiency called anomalous trichromacy, which occurs when one of the three cone pigments is altered in its spectral sensitivity. This results in an impairment, rather than loss, of trichromacy, i.e. the normal three-dimensional color vision.

Concepts in order to convert colored images for improving the color differentiation for color blind comprise—inter alia—methods in which first the kind and the degree of color vision deficiency of a specific person is assessed, and thereafter, a method that is tailored to the person is applied, for example, by applying different textures to different colors. Further methods comprise changing the position of specific colors in the corresponding color space, for example, the CIE Yu*v* color space in order to increase the difference between respective colors.

Related concepts are, for example, known from U.S. Pat. No. 7,394,468, US 2010/0134810, Chin-Lun Lai; Shu-Wen Chang, "An Image Processing based visual Compensation System for Vision Defects", 2009, 5$^{th}$ International Conference on Intelligent Information Hiding and Multimedia Signal Processing, 12-14 Sep. 2009, and Yia-Bin Huang, Sih-Ying Wu, Chu-Song Chen, "Enhancing Color Representation for the Color Vision Impaired", September 2008.

SUMMARY OF THE INVENTION

It is an object of the present invention to provide an improved method for processing image data by which color vision deficiency can be compensated for. Moreover, it is an object of the present invention to provide a corresponding image processing device.

According to the present invention, the above objects are achieved by the claimed matter according to the independent claims.

The accompanying drawings are included to provide a further understanding of embodiments of the invention and are incorporated in and constitute a part of this specification. The drawings illustrate the embodiments of the present invention and together with the description serve to explain the principles. Other embodiments of the invention and many of the intended advantages will be readily appreciated, as they become better understood by reference to the following detailed description. The elements of the drawings are not necessarily to scale relative to each other. Like reference numbers designate corresponding similar parts.

DETAILED DESCRIPTION

In the following detailed description reference is made to the accompanying drawings, which form a part hereof and in which are illustrated by way of illustration specific embodiments in which the invention may be practiced. In this regard, directional terminology such as "top", "bottom", "front", "back", "leading", "trailing" etc. is used with reference to the orientation of the Figures being described. Since components of embodiments of the invention can be positioned in a number of different orientations, the directional terminology is used for purposes of illustration and is in no way limiting. Is to be understood that other embodiments may be utilized and structural or logical changes may be made without departing from the scope defined by the claims.

Figure 1C:
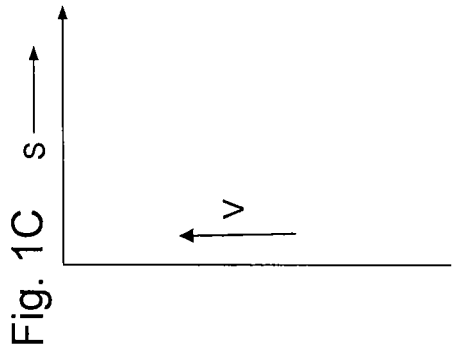
FIGS. 1A to 1C illustrate an example of color representation in the HSV space.
Figure 1A:
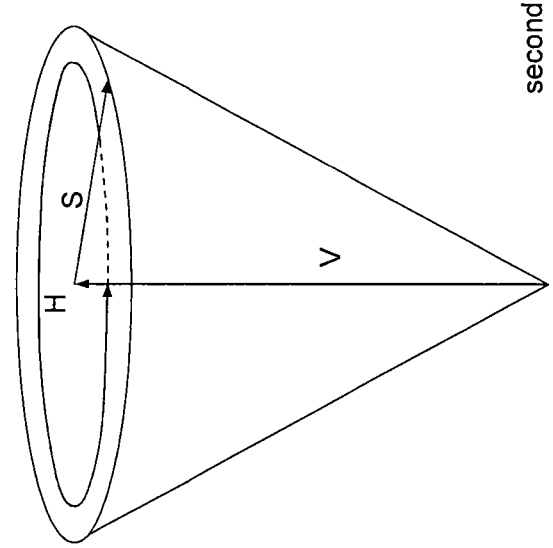
Figure 1B:
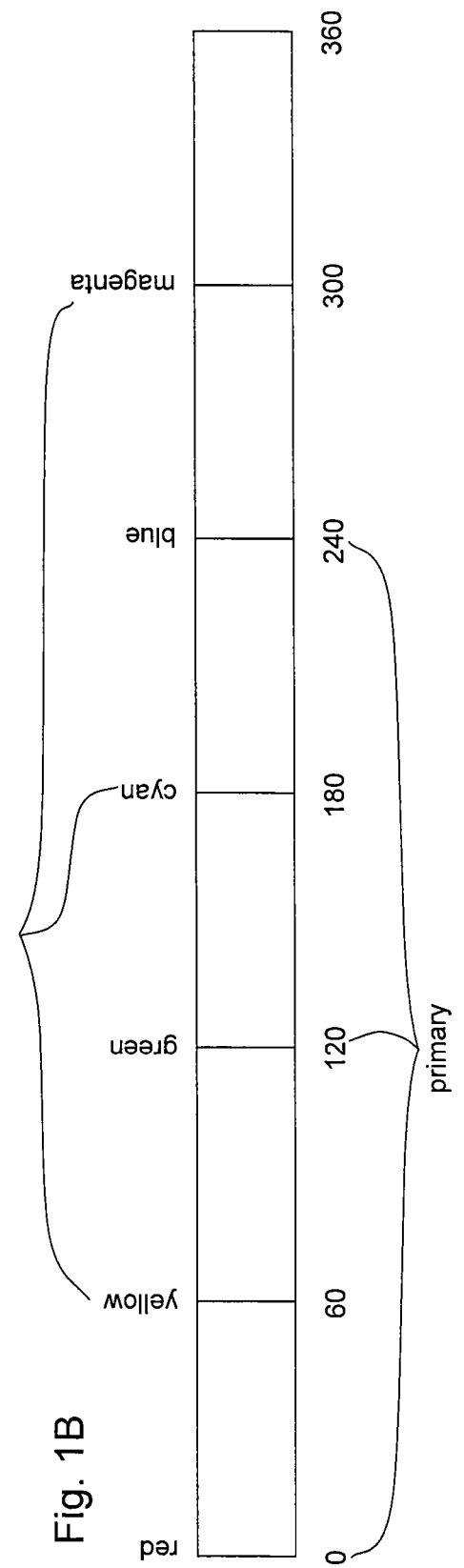

As will be discussed hereinafter, a method of processing image data may comprise identifying picture elements of a first image portion having a first hue and a first saturation assigned to the first hue, the first hue lying in a first critical hue interval, identifying picture elements of a second image portion having a second hue and a second saturation assigned to the second hue, the second hue lying in a second critical hue interval, and changing the first saturation by an amount data S. The method of processing image data is carried out in the HSV color space. Accordingly, depending on the format of the input image data, prior to the method of processing image data, a conversion from the original color space to the HSV color space will take place. FIG. 1A shows a schematic representation of colors in the HSV color space. In the HSV color space, H stands for the hue, S stands for the saturation and V stands for the value. H is measured in angles and starts at the red primary color at 0°, passes through the green primary color at 120° and the blue primary color at 240° and then wraps back to red primary color at 360°. At 60°, 180°, and 300° the secondary colors yellow, cyan and magenta are disposed. Inbetween the several mixtures of the colors are disposed. The saturation S refers to the perceived intensity of a specific color. For example, a saturation S of 0% refers to a neutral grey, a saturation of 50% relates to a weak color and 100% saturation refers to the saturated, pure color. A value of 0% refers to no lightness, whereas a value of 100% refers to the complete lightness of the color. Using the H, S and V value, one can easily detect the critical colors, for example red and green. For the segmentation of red and green colors a weighted map is used. For example, the hue interval for red may be 330° to 30° and for green, it may be 80° to 140°. In a color transit region, a H value may correspond to two different colors. For example, a H value of 330° may stand for red, but may also stand for purple. The tolerance region for such an ambiguity is selected as 15°.

Nevertheless, as is clearly to be understood, all of these values can be changed, when necessary. Accordingly, for processing image data, in order to better discriminate between red and green, the first critical hue interval may be 330° to 30° and the second critical hue interval may be 80 to 140°, or vice versa. Accordingly, after identifying a first image portion having a first hue lying in the first critical hue interval of 330° to 30° and a second image portion having a second hue lying in the second critical hue interval of 80 to 140°, the first and/or the second saturation may be changed.

In the context of the present specification the term "image portion" refers to a number of picture elements such as pixels having a hue lying within a specific hue range. For example, when considering "an image portion having a first hue, the first hue lying in a first critical hue interval", this expression means that the picture elements of this image portion have hues that lie in the first critical hue interval.

Individuals with normal color vision are less sensitive to a change of saturation than those with color vision deficiency. Accordingly, in order to improve the color perception for individuals with CVD and—at the same time—preserve the original impression for individuals with normal color perception, the processing may be performed to change the saturation of at least one of the colors in the critical hue interval. According to an embodiment, the first saturation may be changed by an amount ΔS, whereas at least one of the first and second hues is not changed. Applying this method to the HSV representation shown in FIG. 1A, this means, that for a given hue, S is increased by an amount ΔS so that the S value moves outwards along the corresponding arrow. Normally, the saturation is increased so as to enhance the contrast of the image or, in other words, ΔS has a positive value. According to an embodiment, the values for H and V do not change. Nevertheless, as is clearly to be understood, according to specific embodiments, the values for H and for V may change.

When an object is illuminated by a low color temperature light source, the resulting image may appear reddish. When an object is illuminated by a high color temperature light source, the resulting image may appear bluish. Therefore, according to an embodiment, white balancing may be carried out before the detection of critical colors.

Further, the white balancing may be affected by image noise so that it may be temporally unstable. For example, the reddish offset amount removed from the image at time t may be different from that at time t+1. Therefore, in order to stabilize the white balancing in an image sequence, a temporally recursive filter may be used. For example, the temporally recursive filter may be controlled by the image mean value. In this context, the term "image mean value" relates to a luminosity mean value of the image. Nevertheless, as is clearly to be understood, other values such as hue or saturation may be used as well. If the image mean value does not change, the amount of white balancing, e.g. the reddish amount to be removed, remains unchanged among neighboring images.

Image skin color regions, such as faces may become unnatural after performing the processing method described above. Therefore, according to a further embodiment, the skin color regions may be excluded from being processed. For example, first, the skin regions may be detected, and then the image data relating to the skin portion may be excluded from the above-described processing method. In the transition areas between skin color region and other non-skin color region, the above method may be applied.

A further embodiment that aims at processing image data so as to obtain natural skin colors, is based upon the finding that skin color is usually not related to green color but only to red color. Accordingly, in order to provide a natural impression of the skin color, the method may be performed in that manner, that the saturation of the red regions is not changed and only the green regions are processed. In this way, skin regions may be displayed naturally while at the same time saving computational cost which would be necessary to perform skin detection.

Figure 2:
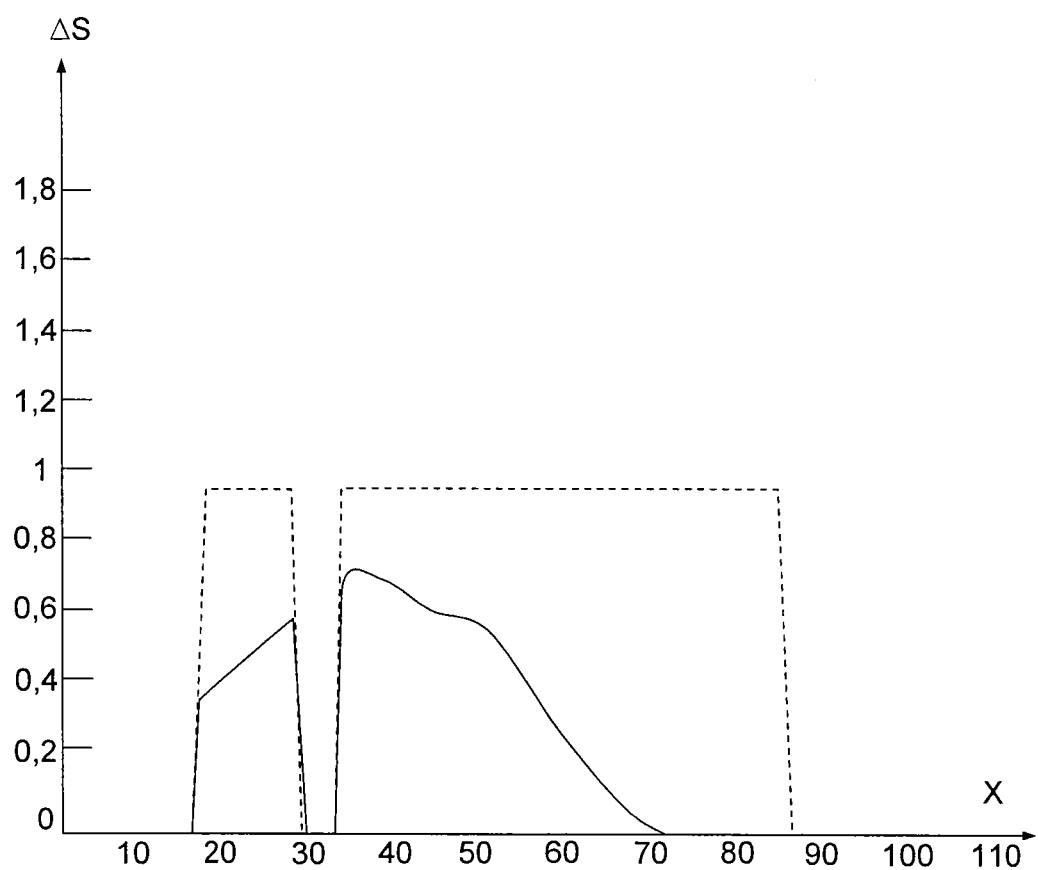
FIG. 2 shows the enhancement of adjacent objects according to an embodiment.

According to still a further embodiment, the image processing method may be adaptive or—differently stated—based on the image content. According to this embodiment, after performing a color detection process, neighboring region of red colors or green colors may be detected. For example, red image portions which are adjacent to green image portions may be detected or vice versa. Thereafter, the distance between a currently contemplated red picture element and a green image portion may be measured. Since usually, the distance between a picture element and an extended region may have varying values, an appropriate mean value is determined. For example, this may be accomplished using a Gaussian filter. Moreover, the distance between the picture element and the nearest region of the green image portion may be determined. Further, the detection result of the red and green regions may be post-processed by a noise reduction function, in order to remove outliers. Thereafter, the distance between the red picture element and the green image portion is used to automatically control the contrast enhancement amount, i.e. the amount of transforming red to redder and/or transforming green to greener. In other words, the amount ΔS is determined depending on the distance between the red picture element and the green image portion. For example, the change of the contrast enhancement amount ΔS may be controlled by soft coring curve to keep a smooth transition. This is also shown in FIG. 2, in which different objects are shown by the broken lines. The broken lines illustrate a first object having a first hue in a first critical hue interval and a second object having a second hue in a second critical hue interval. The full line denotes the amount ΔS which depends from the distance between the two image portions. To be more specific, near the edge of any of these objects, the amount ΔS have its maximum, whereas it decreases with increasing distance from the edge between the first and second objects. According to this embodiment the amount ΔS varies within the first image portion to have its maximum at boundary to the second image portion. According to still a further embodiment, the change of the saturation value may depend from a distance between the boundaries between the first and second image portions wherein an appropriate mean value between the several distance values may be taken, for example, using a Gaussian filter and, optionally, a noise reduction process.

Although this embodiment has been described in terms of red and green color, it is clearly to be understood, that it may be equally applied to any other pair of critical colors such as yellow and blue, for example. The method described above improves the color perception of individuals with color vision deficiency without the necessity of exactly knowing the degree of color vision deficiency. Due to the adaptive image processing as described above, the differentiation of colors is improved. On the other hand, the natural image impression of processed color images remains so that people with normal color vision may equally watch the images without getting the impression that the colors have been altered or processed.

Figure 3:
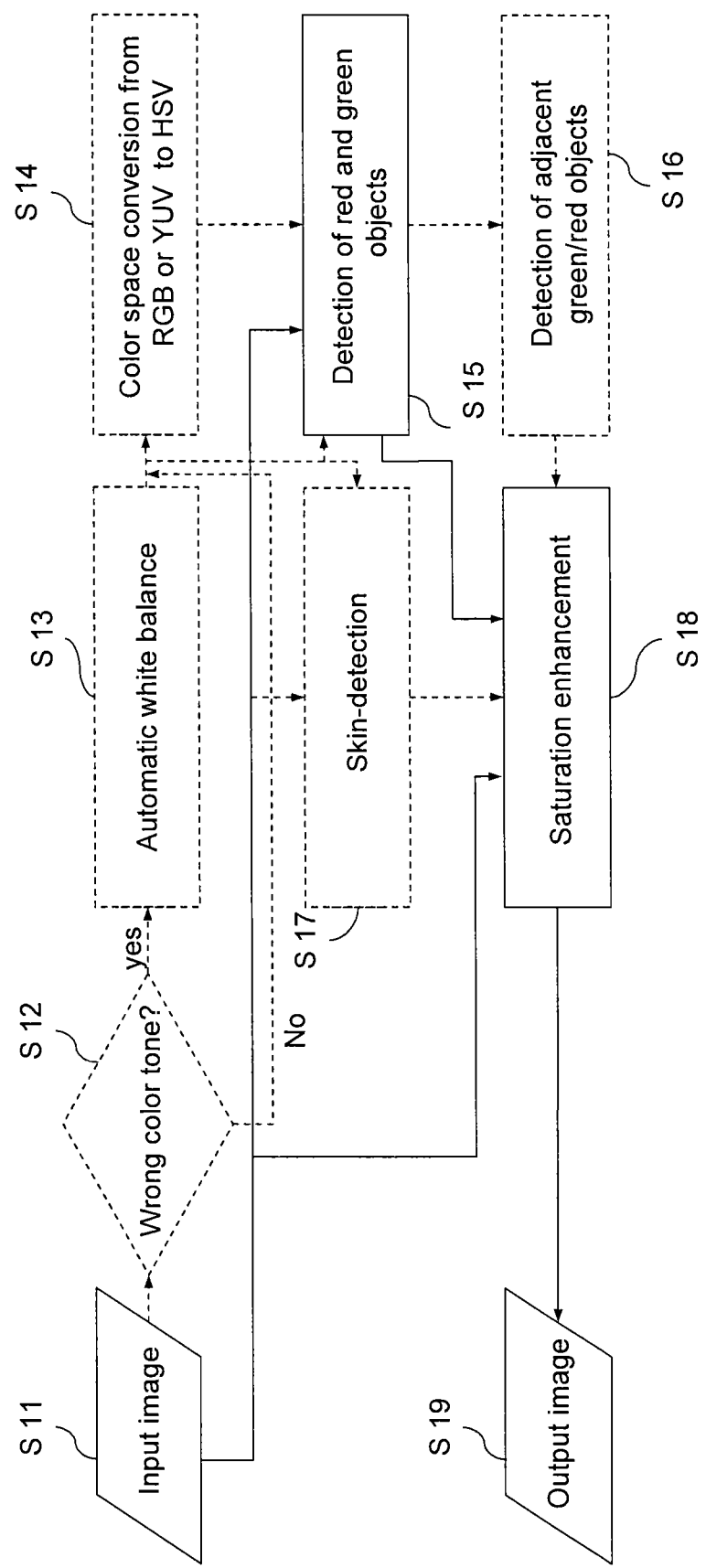
FIG. 3 illustrates an embodiment of an image processing method.

FIG. 3 illustrates the image processing method according to embodiments. In step S11, image data are input into the processing device. The input image data are processed at step 15 to perform detection of red an green objects. At step S15, a first object corresponding to a first image portion having a first hue and a first saturation is identified, wherein the first hue lies in a first critical hue interval. Further, a second object corresponding to a second image portion having a second hue and a second saturation is identified. The second hue lies in a second critical hue interval. Then, at step S18, the input image data are processed to change the first saturation by an amount $\Delta S$. In particular, the first saturation is increased. Finally, the image data are output (step S19). The first and the second hue may relate to the red and green color or to the green and red color or to blue and yellow or yellow and blue. Optionally, it may be determined at step S12, whether there is a wrong color tone which may be caused by the illuminating light conditions. If a wrong color tone is detected, an automatic white balance may be performed at step S13. Thereafter, optionally, the method may advance to step S14, S15 or S17. Depending on the color space in which the original input image data are defined, a color space conversion from RGB or the original color space to the HSV space may take place. As still a further option, skin regions may be detected and excluded from the method described above (step S 17).

Optionally, the method may further comprise the detection of adjacent green/red objects (S16). According to this option, the distance between neighboring objects having hues lying in the first and second critical hue interval is determined. Further, the change of the saturation $\Delta S$ is adjusted depending on this difference.

Figure 4:
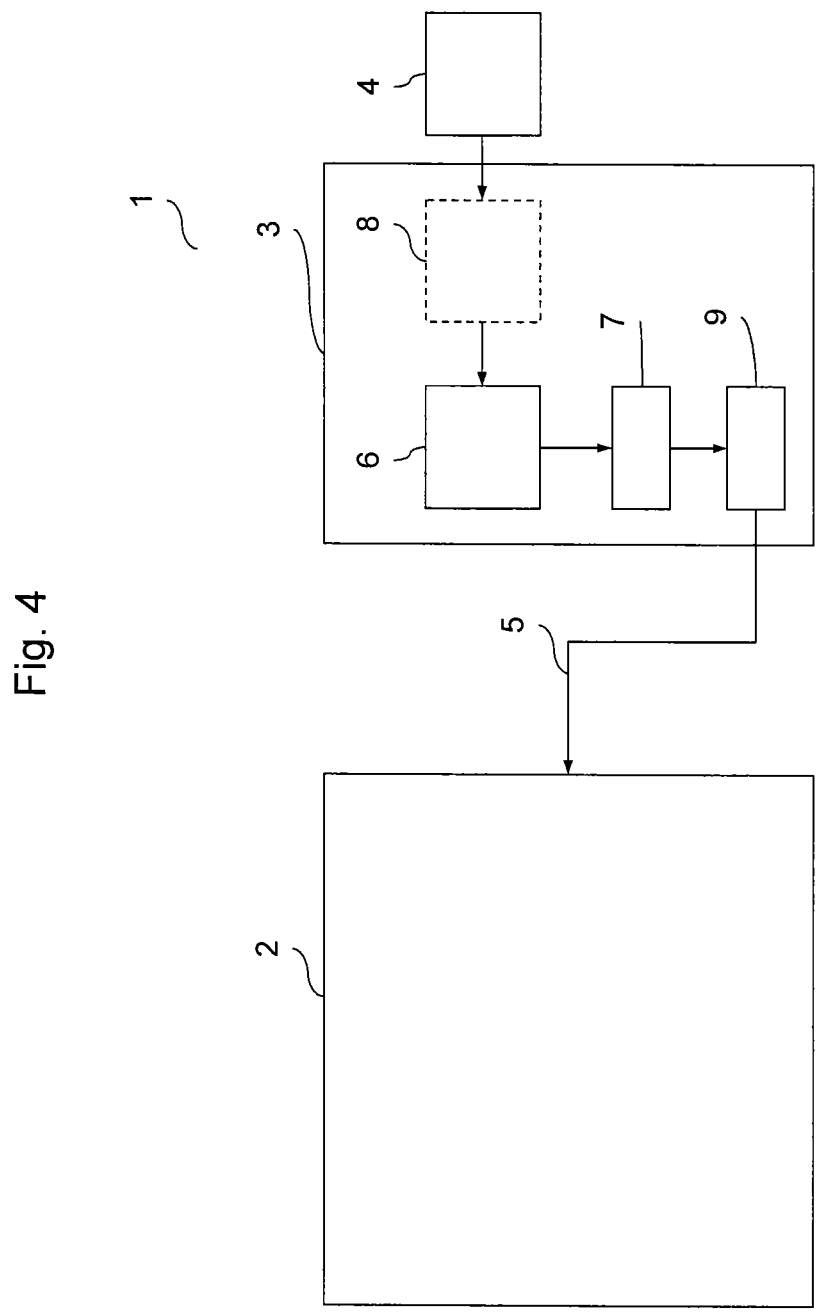
FIG. 4 illustrates components of an image processing device according to an embodiment.

FIG. 4 shows an embodiment of an image processing device according to an embodiment. The image display device 1 shown in FIG. 4 may form part of an arbitrary electronic equipment such as a computer, a television, a notebook, a personal digital assistant (PDA), a mobile phone, a special kind of visualization device such as glasses for color-blind persons, and others. Roughly speaking, the image display device 1 may be any kind of display device that may output colored image data. The display device 1 comprises a display 2 such as a liquid crystal display, a cathode ray tube, LED based display and others. The display 2 may as well be a printer or anything that transfers the image data to a permanent or almost permanent medium. The display 2 is connected with an image processing device 3. Image data 4 may be input into the image processing device 3. For example, the image data 4 may be input by an appropriate cable or in a wireless manner. Further, the image data 4 may be already stored and contained within the image processing device 3. The processing device 3 performs the functionality of the image processing method illustrated in FIG. 3. The image data 4 are transmitted to the analyzing device 6. The analyzing device is configured to analyze the image data to identify a first image portion having a first hue and a first saturation assigned to the first hue, the first hue lying in a first critical hue interval, and a second image portion having a second hue and a second saturation assigned to the second hue, the second hue lying in a second critical hue interval. The image processing device 3 further comprises a processing unit 7, that is operable to process the input image data by changing the first saturation by an amount $\Delta S$. The image data are processed in this manner and may be output to the display 2 as output image data 5.

According to an embodiment, single images or a sequence of images such as a movie may be input as image data to the image processing device 3. For example, if image data of a movie are processed by the image processing device 3, the amount of change of the saturation may vary from single picture to single picture constituting the movie. As a consequence, artefacts such as flickering may occur. According to an embodiment, the processing device 3 may further comprise a control mechanism 9 such as temporally recursive filter or an Infinite Impulse Response (IIR) filter. The characteristics or coefficients of the temporally recursive filter or the Infinite Impulse Response filter are controlled, for example, by the image mean value to stabilize the change amount. Accordingly, the control mechanism controls an amount of change of the first saturation delta S so that a difference between delta S of subsequent images of the image sequence does not exceed a predetermined threshold value. The control mechanism 9 may form part of the processing unit 7. As is to be clearly understood, this control mechanism may not only be applied to the control of the saturation delta S but also to any other amount that is to be changed between subsequent pictures, such as the automatic white balancing.

According to an embodiment, the analyzing device 6 may be configured to measure a distance between the first and the second image portions. The analyzing device may set a change of the first saturation data S depending from the distance. Alternatively, the processing unit may set $\Delta S$ depending from the distance. Further, an additional pre-processing device 8 may be included in the image processing device 3. For example, the pre-processing device may perform an automatic white balancing. The pre-processing device 8 may detect skin portions. As is to be clearly understood, the pre-processing device 8 may perform one or any of these functions.

As is clearly to be understood, the analyzing device 6, the processing device 7 and the pre-processing device 8 may perform a special functionality of more general components of an image processing device which is conventionally included in the display device 1 or in the respective device to which the display 2 is connected. For example, the processing device that performs a basic functionality of an image processing device may additionally perform the functionality as described above. Alternatively, the processing device 7 described may be a separate component of the image processing device 3. Likewise, a general analyzing device of the image processing device may integrate the analyzing device 6. Alternatively, the analyzing device 6 may be a separate component of the image processing device 3. The image processing device 3 may include further components so as to perform a basic functionality. For example, the image processing device 3 may further comprise a controller.

While embodiments of the invention have been described above, it is obvious that further embodiments may be implemented. Moreover, additional embodiments may include any sub-combination of the features included in the claims. Accordingly, the spirit and scope of the appended claims should not be limited to the description of the embodiments contained therein.

The invention claimed is:
1. A method of processing image data, comprising:
 identifying first picture elements of a first image portion having a first hue and a first saturation assigned to the first hue, the first hue lying in a first critical hue interval;
 identifying second picture elements of a second image portion having a second hue and a second saturation assigned to the second hue, the second hue lying in a second critical hue interval;
 changing the first saturation by an amount delta S;

measuring a distance on the image data between a picture element of the first picture elements and a picture element of the second picture elements; and setting, by circuitry, the delta S that varies for the first picture elements lying in the first image portion so that the delta S decreases as the distance increases, wherein at least one of the first and the second hues is not changed.

2. The method of claim 1, further comprising performing an automatic white balancing before identifying the first and second image portions.

3. The method of claim 2, wherein the automatic white balancing is performed using a temporally recursive filter.

4. The method of claim 1, further comprising detecting skin portions, wherein the saturation of a hue of picture elements of the skin portions is not changed.

5. The method of claim 1, wherein the first critical hue interval comprises green color.

6. The method of claim 1, wherein image data of an image sequence are processed, the method further comprising controlling an amount of change of the first saturation delta S so that a difference between the delta S of subsequent images of the image sequence does not exceed a predetermined threshold value.

7. The method of claim 1, wherein the delta S has a maximum value near an edge of the first image portion that is located adjacent to the second image portion.

8. The method of claim 1, wherein the distance is measured by taking a mean value between a plurality of distance values between a picture element of the first picture elements and a picture element of the second picture elements.

9. The method of claim 1, further comprising:
changing the second saturation by an amount second delta S; and
setting the second delta S that varies for picture elements lying in the second image portion so that the second delta S decreases as the distance increases by circuitry.

10. A non-transitory computer readable medium including executable instructions, which when executed by a computer cause the computer to execute a method of processing image data, the method comprising:
identifying first picture elements of a first image portion having a first hue and a first saturation assigned to the first hue, the first hue lying in a first critical hue interval;
identifying second picture elements a second image portion having a second hue and a second saturation assigned to the second hue, the second hue lying in a second critical hue interval;
changing the first saturation by an amount delta S;
measuring a distance on the image data between a picture element of the first picture elements and a picture element of the second picture elements; and
setting the delta S that varies for the first picture elements lying in the first image portion so that the delta S decreases as the distance increases by circuitry, wherein at least one of the first and the second hues is not changed.

11. An image processing device, comprising:
circuitry configured to:
analyze image data to identify first picture elements of a first image portion having a first hue and a first saturation assigned to the first hue, the first hue lying in a first critical hue interval, and second picture elements of a second image portion having a second hue and a second saturation assigned to the second hue, the second hue lying in a second critical hue interval;
change the first saturation by an amount delta S;
measure a distance on the image data between a picture element of the first picture elements and a picture element of the second picture elements; and
set the delta S that varies for the first picture elements lying in the first image portion so that the delta S decreases as the distance increases,
wherein at least one of the first and the second hues is not changed.

12. The image processing device of claim 11, wherein the circuitry is configured to perform an automatic white balancing before analyzing the image data.

13. The image processing device of claim 12, wherein the circuitry comprises a temporally recursive filter.

14. The image processing device of claim 11, being operable to process image data of an image sequence, wherein the circuitry is configured to control an amount of change of the first saturation delta S so that a difference between the delta S of subsequent images of the image sequence does not exceed a predetermined threshold value.

15. An image processing according to claim 11, further comprising a display to display the image.

16. The image processing device according to claim 15, wherein the display is a component of a computer, a television, a notebook, a personal digital assistant, a mobile phone or a printer.

17. An image processing device, comprising:
means for analyzing the image data to identify first picture elements of a first image portion having a first hue and a first saturation assigned to the first hue, the first hue lying in a first critical hue interval, and second picture elements of a second image portion having a second hue and a second saturation assigned to the second hue, the second hue lying in a second critical hue interval;
means for changing the first saturation by an amount delta S;
means for measuring a distance on the image data between a picture element of the first picture elements and a picture element of the second picture elements; and
means for setting the delta S that varies for the first picture elements lying in the first image portion so that the delta S decreases as the distance increases,
wherein at least one of the first and the second hues is not changed.

* * * * *